United States Patent
Rambaud et al.

(10) Patent No.: US 6,876,671 B1
(45) Date of Patent: Apr. 5, 2005

(54) METHOD FOR TRANSMITTING VARIABLE SIZED PACKETS FROM AN UPPER LAYER OF A STACK OF COMMUNICATION PROTOCOL LAYERS TO A LOWER LAYER INTENDED TO MANAGE FIXED SIZED PACKETS

(75) Inventors: Luc Rambaud, Rennes (FR); Francis Pitcho, Rennes (FR); Herve Bonneville, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 923 days.

(21) Appl. No.: 09/593,522

(22) Filed: Jun. 14, 2000

(30) Foreign Application Priority Data

Jun. 15, 1999 (EP) .............................. 99401476

(51) Int. Cl.[7] .............................. H04J 3/24; H04J 3/22
(52) U.S. Cl. .................... 370/474; 370/469; 714/758
(58) Field of Search .................... 370/395.1, 395.52, 370/395.65, 350, 503, 392, 471, 476, 474, 469; 714/48, 758

(56) References Cited

U.S. PATENT DOCUMENTS

| | | | | |
|---|---|---|---|---|
| 5,414,707 A | * | 5/1995 | Johnston et al. | 370/395.6 |
| 5,467,342 A | * | 11/1995 | Logston et al. | 370/253 |
| 5,822,321 A | * | 10/1998 | Petersen et al. | 370/474 |
| 6,041,054 A | * | 3/2000 | Westberg | 370/389 |
| 6,317,433 B1 | * | 11/2001 | Galand et al. | 370/395.2 |

FOREIGN PATENT DOCUMENTS

| | | |
|---|---|---|
| WO | WO 98/18286 A | 4/1998 |
| WO | WO 98/18287 A | 4/1998 |
| WO | WO 98/34380 A | 8/1998 |

* cited by examiner

Primary Examiner—Duc Ho
(74) Attorney, Agent, or Firm—Birch, Stewart, Kolasch & Birch, LLP

(57) ABSTRACT

The present relates to a method for transmission of variable sized packets from an upper layer of a stack of communication protocol layers to a lower layer intended to manage fixed sized packets. According to the invention, said method comprises the steps of:

forming a segmentation and reassembly layer intended to manage SAR packets, each SAR packet being made up of a header obtained in adding delineation information to the header of one of the variable sized packets of the upper layer and of a payload which contains the payload of the upper layer packet, and segmenting the flow of the thus obtained SAR packets into fixed sized packets for transmitting to the lower layer.

The present invention also relates to a packet intended to be managed by a layer of a communication protocol stack between an upper layer supporting variable sized packets and a lower layer supporting fixed sized packets. It finally relates to a method for recovering a variable sized packet from a flow of such packets.

20 Claims, 5 Drawing Sheets

US 6,876,671 B1

METHOD FOR TRANSMITTING VARIABLE SIZED PACKETS FROM AN UPPER LAYER OF A STACK OF COMMUNICATION PROTOCOL LAYERS TO A LOWER LAYER INTENDED TO MANAGE FIXED SIZED PACKETS

SUMMARY OF THE INVENTION

The present invention relates to a method for transmitting variable sized packets from an upper layer of a stack of communication protocol layers to a lower layer intended to manage fixed sized packets. It also relates to a packet intended to be managed by a layer of a communication protocol stack between an upper layer supporting variable sized packets and a lower layer supporting fixed sized packets. It finally relates to a method for recovering a variable sized packet from a flow of such packets.

The upper layer packets may contain data of different types, for example real time traffic data or non real time traffic data. They can be data packets, audio packets or video packets.

The upper layer traffic and lower layer traffic may be asynchronous, which means that they sometime have no data to be sent. They may also be synchronous, which means they must periodically transmit packets to its lower layer.

In order to solve the above-mentioned problem, the method according to the invention comprises the step of forming a segmentation and reassembly layer intended to manage packets, said SAR packets, made up from upper layer packets and in adding delineation information to the headers of the packets of the upper layer and the step of segmenting the thus obtained SAR packets into fixed sized packets for transmitting to the lower layer.

Note that the packets of the segmentation and reassembly layer can also be named according to a terminology used in the field of telecommunications, Segmenting and Reassembling Protocol Data Units or SAR PDU.

Preferentially, said delineation information is made up of a flag with a specific pattern.

According to another characteristic of the present invention, the header of each SAR packet is provided with a field which codes the length of the payload of said packet.

According to another characteristic of the present invention, the payload of each SAR packet is made up of the payload of one of upper layer packets.

According to another characteristic of the present invention, the header of each SAR packet is provided with a field which is a replica of the header of the upper layer packet whose payload constitutes its payload.

When the headers of the upper layer packets have different lengths depending on the characteristics of their payloads, the header of each SAR packet is provided with a field which codes the length of the upper layer packet header.

According to another characteristic of the invention, the header of each SAR packet is provided with a cyclic redundancy code applied to the whole header, the delineation information excepted.

According to another characteristic of the invention, each SAR packet is optionally provided with a cyclic redundancy code applied to the payload of said packet.

The present invention relates also to a SAR packet (or data unit) which can be managed by a segmentation and reassembly layer of a communication protocol stack which is between an upper layer intended to manage variable sized packets and a lower layer intended to manage fixed sized packets.

According to one characteristic of the present invention, that SAR packet is also a variable sized packet and is made up of a header with a delineation information and a payload which contains the payload of one of the upper layer packet. Preferentially, the delineation information is made up of a flag with a specific pattern.

The present invention also relates to a method for recovering a variable sized packet of an upper layer of a stack of communication protocol layers from a flow of packets such as those described heretofore, said method comprising the steps of:

searching in the flow of packets an delineation information and, when found, decoding a header of a found packet, then extracting the upper layer packet header, and, pointing out a payload of the found packet, then extracting the upper layer

BRIEF DESCRIPTION OF THE DRAWINGS

The foregoing characteristics of the invention, as well as others, will appear more clearly from reading the following description of an example of embodiment of the invention, said description being made in connection with the accompanying drawings in which:

Reference will now be made to FIG. 1, which shows a transmitter 10 which is linked to a receiver 20 for communication. The transmitter 10 and the receiver 20 are each represented as a protocol stack of layers each carrying out particular functions. In FIG. 1, only three layers $L_{i+1}$, $L_i$, $L_{i-1}$, are represented. At the transmitter side, data are processed by these three layers, first by the upper layer $L_{i+1}$, then by the layer $L_i$ and finally by the lower layer $L_{i-1}$. They are then transmitted to the receiver 20 (dash line) after complete processing in the protocol stack of the transmitter 10. At the receiver side, data are processed by the lower layer $L_{i-1}$, then by the layer $L_i$ and finally by the upper layer $L_{i+1}$. They are then transmitted to an upper layer or to an application.

FIG. 2 shows a protocol stack comprising an upper layer $L_{i+1}$, a lower layer $L_{i-1}$ and, between them, a layer $L_i$.

According to the present invention, in order to transmit data carried by the upper layer packets $P_{i+1}$ to the lower layer $L_{i-1}$, the layer $L_i$ build up packets $P_i$ which are variable sized packets and which can be segmented into fixed sized packets $P_{i-1}$ intended to be managed by the layer $L_{i-1}$. The thus formed layer $L_i$ is named in the following of the present specification SAR layer, as Segmentation And Reassembly layer. The packets built up by the SAR layer are said SAR packets.

Figure 1:
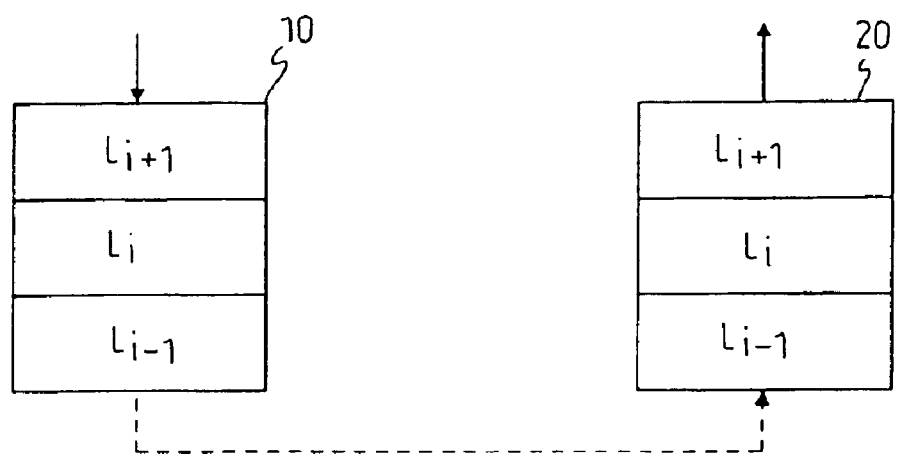
FIG. 1 is a schematic diagram showing a transmitter and a receiver with their respective layers within the scope of the present invention.
Figure 2:
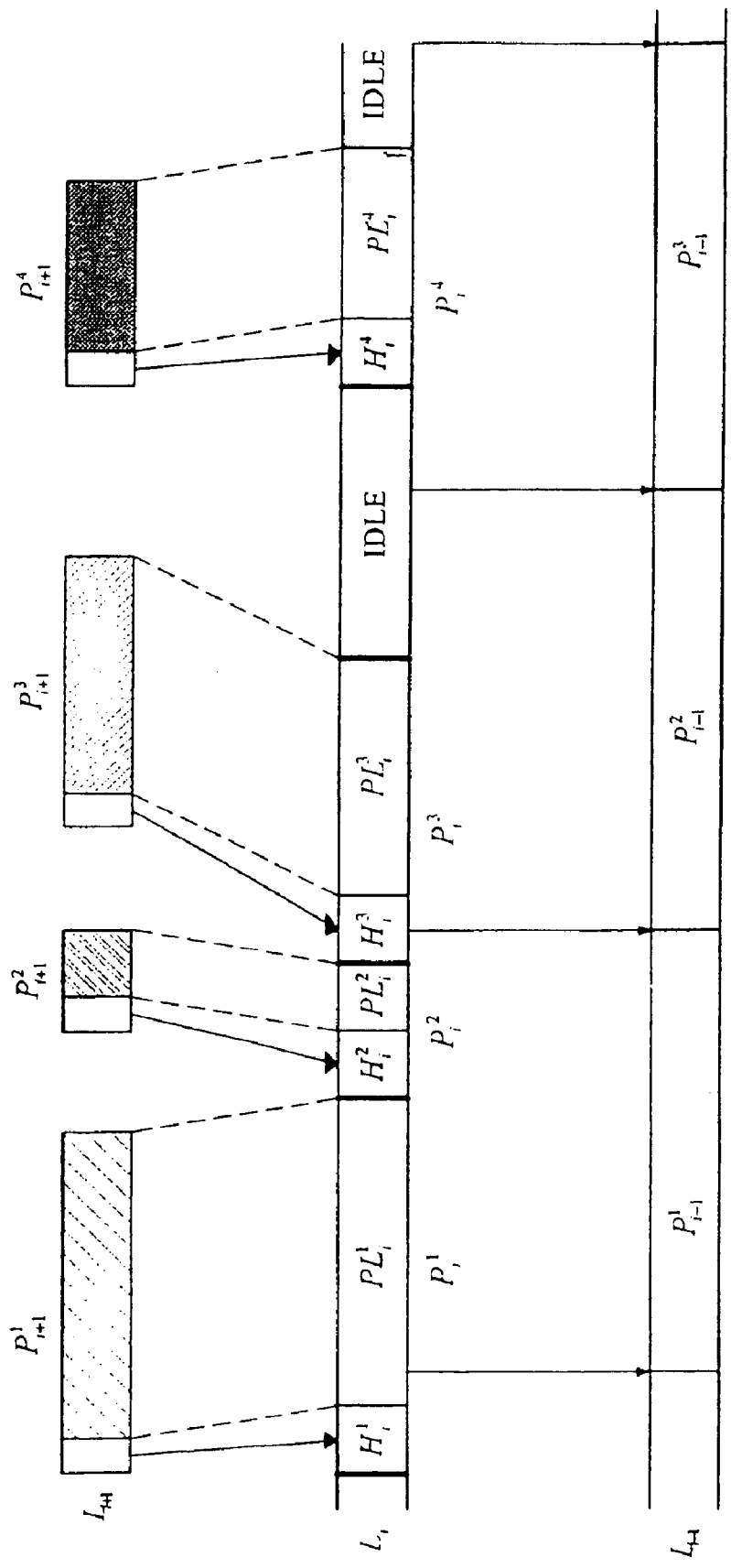
FIG. 2 is a schematic diagram showing an upper layer, a SAR layer and lower layer and their relation according to the present invention.

The upper layer $L_{i+1}$ can manage packets of variable length that may support different types of traffics, for example real time (RT) traffic, non-real time (NRT) traffic, etc. In FIG. 2, a different hatching schematises each type of traffic.

According to the present invention, at the transmitter side, the SAR layer $L_i$ builds up SAR packets $P_i$ in adding to each packet $P_{i+1}$ sent from the upper layer $L_{i+1}$, delineation information in the form of a header $H_i$. The header $H_i$ of each packet $P_i$ contains the header of one upper layer packet $P_{i+1}$. The payload $PL_i$ of each packet $P_i$ is made up of the payload of one upper layer packet $P_{i+1}$.

In FIG. 2, SAR packet $P_i^1$ is constituted of a header $H_i^1$ and a payload $PL_i^1$ which is built up from the payload of the packet $P_{+1}^1$ of the upper layer $L_{i+1}$. Likewise, SAR packet $p_i^2$ is constituted of a header $H_i^2$ and a payload $PL_i^2$ which is built up from the payload of the packet $P_{i+1}^2$ of the upper layer $L_{i+1}$. It is the same for SAR packets $P_i^3$ et $P_i^4$.

The SAR layer $L_i$ also segments the stream of the thus formed packets $P_i$ into a stream of fixed length packets $P_{+1}$ that are then sent to the lower layer $L_{-1}$.

When there is not enough data to complete the packet of the lower layer $L_{i-1}$, the layer $L_i$, if needed, adds idle information to build up the fixed sized packet of layer $L_{i-1}$. As it will be explained hereinafter, idle data can be made up of any type of data, the flag pattern preferentially excepted

DETAILED DESCRIPTION

As can be seen in FIG. 2, there are no alignments between SAR packets $P_i$ and lower layer packet $P_{i-1}$. In FIG. 2, the packet $P_{i+1}^1$ is made up of a part from the packet $P_i^1$, of the whole packet $P_i^2$ and another part from the packet $P_i^3$. The packet $P_{i-1}^2$ is made up of the rest of the packet $P_i^3$ and of idle data. The packet $P_{i-1}^3$ is made up of idle data and of whole the packet $P_i^4$.

Note that the Layer $L_{i-1}$ has no information concerning the frame structure that is used by the upper layer $L_{i+1}$.

Figure 3:
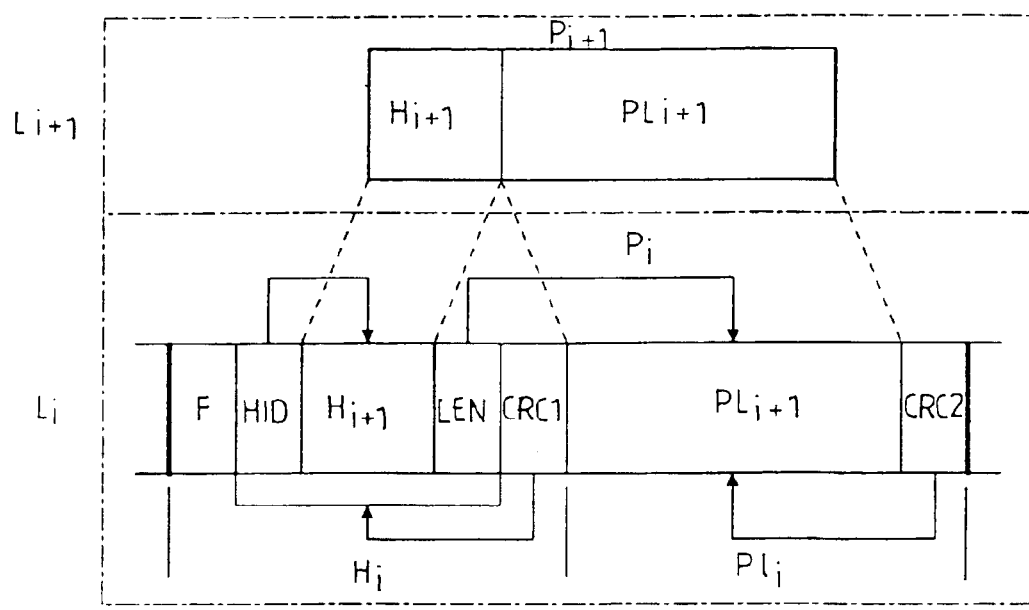
FIG. 3 is a schematic diagram showing the making up of a SAR packet in relation with an upper layer packet according to the present invention.

FIG. 3 points out the different fields that compose a SAR packet $P_i$ with regard to an upper layer packet $P_{i+1}$. The payload $PL_i$ of the packet $P_i$ is a replica of the payload $PL_{i+1}$ of the packet $P_{i+1}$ of the upper layer $L_{i+}$.

The header $H_i$ contains a flag field F for use to delineate the SAR packet $P_i$ and thus to mark its beginning. The flag field F is formed of a specific pattern, for example a 8 bits pattern such 0xA5 pattern.

The header $H_i$ still contains a field which is the replica of the header $H_{i+1}$ of the upper layer packet $P_{i+1}$ used to build up the SAR packet $P_i$.

Many types of upper layer header $H_{i+1}$ can be generated by the upper layer $L_{i+1}$ which each can be characterised by a specific length of the header $H_{i+1}$. In this case, the SAR layer header $H_i$ can be provided with a header identification field HID which defines either the type or the length of the upper layer header $H_{i+1}$. In the first case, the length of the header $H_{i+1}$ field can be deduced from the type coded by the HID field.

The length of the payload of the SAR packet is coded in a length field LEN.

A CRC1 field is added for detecting bit errors in the HID field, in the header field $H_{+1}$ and in the LEN field can be added. It can be a Cyclic Redundancy Code applied to these fields.

A second CRC2 field for detecting if the payload of the SAR packet has been corrupted during transmission can be added.

Figure 4:
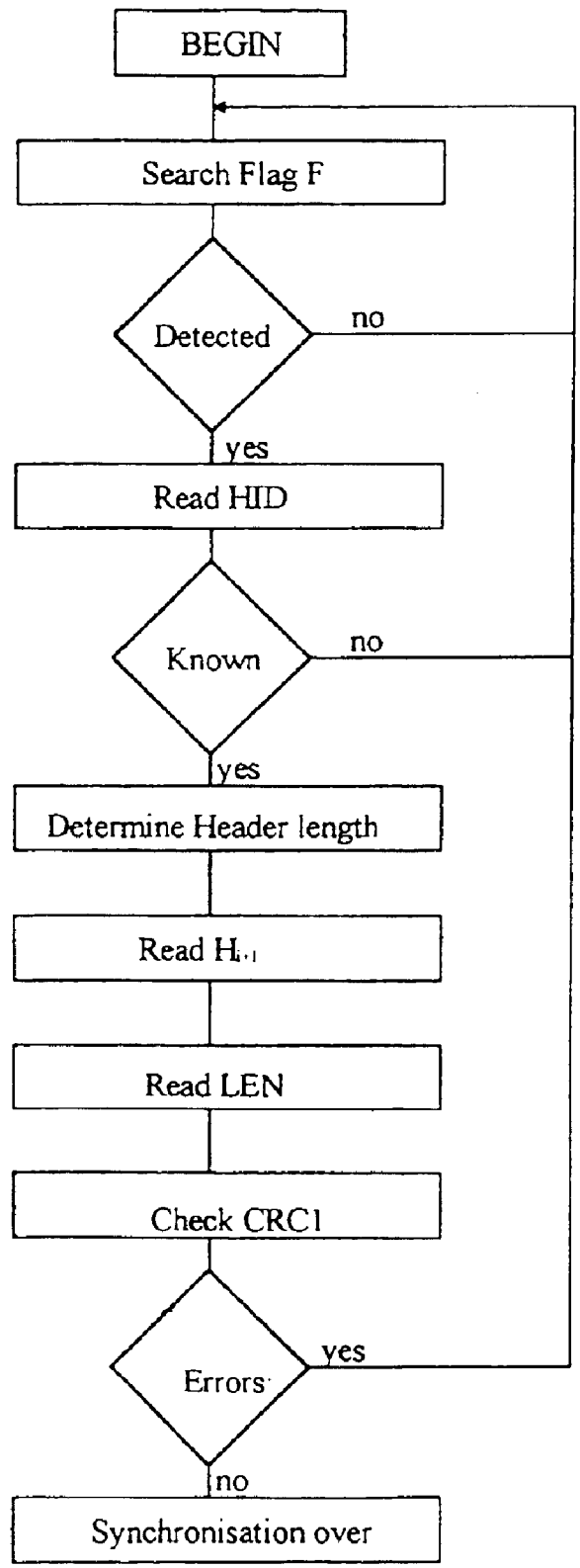
FIG. 4 is a flow chart of the synchronization procedure carried out by the SAR layer of the invention.

At the receiver side, layer $L_{i-1}$ packets are transmitted to the SAR layer $L_i$. In order to get the receiver synchronised with the flow of SAR packets $P_i$, the receiver has to search the delineation information of a packet $P_i$ and, when found, to decode successfully the remaining part of the SAR header $H_i$. Then, it has to point the first byte of the payload $PL_i$. The synchronisation process is now described in relation with FIG. 4, which is a flow chart of the synchronisation procedure.

A flag F is first searched amongst the data that have been received from the lower layer $L_{i-1}$. When the flag F has been found, the HID field is read and the length of the header $H_{i+1}$ is determined.

If the value contained in the HID field does not correspond to a known value, that means that the flag reading step or the HID reading step are erroneous. Therefore, the flag F is again searched.

After a correct header $H_{i+1}$ has been read, the length field LEN is read so as to determine the length of the SAR payload $PL_i$.

The content of the CRC1 field is then checked so as to detect whether or not errors have occurred during the SAR header $H_i$ reading. If the result of this process is correct, the synchronisation process is over. Then, the reading of the SAR payload $PL_i$ can start. If the result is negative, a new flag F searching restarts the synchronisation process.

Note that no mechanism is implemented during transmission to ensure the flag field F does not appear in the SAR payload $PL_i$. Therefore, when flag F is detected, when the value in the HID field is one of a known type and when the CRC1 reading and checking process returns no error detection, there is enough confidence that it is the start of a SAR packet $P_i$.

Note that no particular pattern is required for defining idle data.

Figure 5:
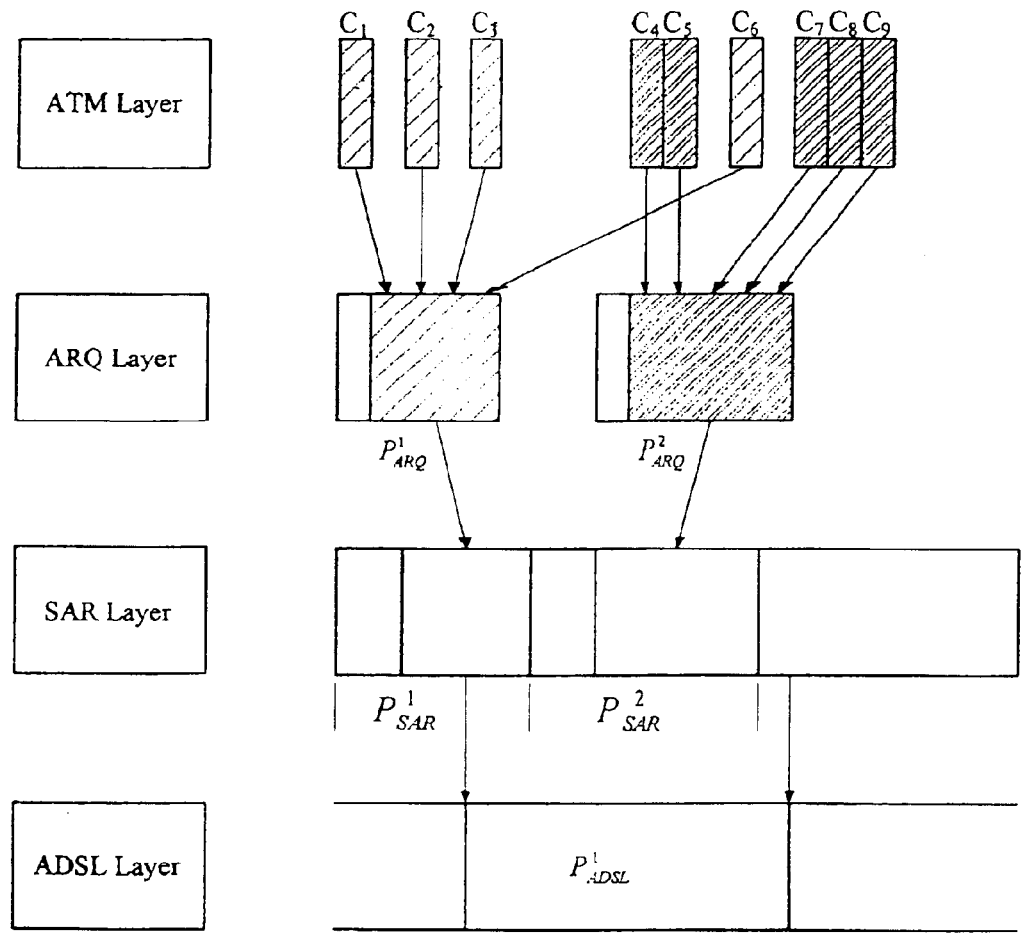
FIG. 5 is a schematic diagram showing a particular embodiment of the present invention.

FIG. 5 illustrates the implementation of the invention in the case where the lower layer corresponds to an ADSL layer and the upper layer to an ARQ layer. The layer above the ARQ (Automatic Retransmission Request) layer is an ATM layer. The ATM layer is intended to bear ATM cells, which are generally composed of 48 bytes for the payload and 5 bytes for the header.

In FIG. 5, the cells $C_1$, $C_2$, $C_3$ and $C_6$ are ATM cells of one same type, for example non real time cells type and the cells $C_4$, $C_5$, $C_7$, $C_8$ and $C_9$ are also ATM cells of another same type, for example real time cells type. The ATM traffic is asynchronous and can be bursty.

The ARQ layer is the layer that builds up ARQ packets from ATM cells when transmitting, extracts ATM cells from ARQ packets when receiving, and manages ARQ packets when lost. Each ARQ packet groups ATM cells of a same type, for example real time or non real time ATM cells, and has a header which is provided to identify the ATM cells type. The length of this header can depend on the type which cells belong to.

The ARQ layer has to manage real or non real time ATM traffic, which implies that ARQ packet length is variable.

In FIG. 5, the cells $C_1$, $C_2$, $C_3$ and $C_6$ are encapsulated in a same first packet $P_{ARQ}^1$ and the cells $C_4$, $C_5$, $C_7$, $C_8$ and $C_9$ are encapsulated in a same second packet $P_{ARQ}^2$.

According to the method of the present invention, the SAR layer builds up SAR packets $P_{SAR}^1$ and $P_{SAR}^2$ and segments them into the ADSL layer, where only one packet $P_{ADSL}^1$ is representated.

The ADSL layer can be synchronous and or asynchronous.

What is claimed is:

1. Method for transmission of variable sized packets from an upper layer of a stack of communication protocol layers to a lower layer intended to manage fixed size packets, said method comprising the steps of:

forming a segmentation and reassembly layer intended to manage SAR packets, each SAR packet being made up of a header obtained in adding delineation information to the header of one of the variable sized packets of the upper layer of the stack, wherein the stack includes at least four layers, one of which is an ARQ (Automatic Retransmission Request) layer, and of a payload which contains the payload of the upper layer packet, and segmenting the flow of the thus obtained SAR packets into fixed sized packets for transmitting to the lower layer.

2. Method of claim 1, wherein said delineation information is made up of a flag with a specific pattern.

3. Method according to claim 1, wherein the header of each SAR packet is provided with a field which codes the length of the payload of each SAR packet.

4. Method according to claim 1, wherein said header is provided with a field which is a replica of the header of the upper layer packet whose payload makes up its payload.

5. Method according to claim 1, wherein the header of each SAR packet is provided with a cyclic redundancy code applied to the whole header, the delineation information excepted.

6. Method according to claim 1, wherein each SAR packet is optionally provided with a cyclic redundancy code applied to the payload of each SAR packet.

7. Method for transmission of variable sized packets from an upper layer of a stack of communication protocol layers to a lower layer intended to manage fixed size packets, said method comprising the steps of:

forming a segmentation and reassembly layer intended to manage SAR packets, each SAR packet being made up of a header obtained in adding delineation information to the header of one of the variable sized packets of the upper layer and of a payload which contains the payload of the upper layer packet, and segmenting the flow of the thus obtained SAR packets into fixed sized packets for transmitting to the lower layer, wherein said header is provided with a field which is a replica of the header of the upper layer packet whose payload makes up its payload, and wherein the headers of the upper layer packets having different lengths depending on the characteristics of their payloads, wherein the header of each SAR packet is provided with a field which codes the length of the upper layer packet header.

8. Packet intended to be managed by a layer of a communication protocol stack between an upper layer supporting variable sized packets and a lower layer supporting fixed size packets, wherein said packet is a variable sized packet whose header is made up in adding a delineation information to the header of the upper layer packet and whose payload contains the payload of said upper layer packet, and wherein said packet header is provided with a field which is a replica of the header of the upper layer packet whose payload makes up its payload, and wherein the headers of the upper layer packets having different lengths depending on the corresponding payload, wherein its header is provided with a length code field which codes the length of the upper layer packet header.

9. Packet according to claim 8, wherein said delineation information is made up of a flag with a specific pattern.

10. Packet according to claim 8, wherein its header is provided with a field which codes the length of the payload of said packet.

11. Packet according to claim 8, wherein its header is provided with a cyclic redundancy code applied to the whole header, the delineation information excepted.

12. Packet according to claim 8, wherein it is provided with a cyclic redundancy code applied to its whole payload.

13. Method for recovering a variable sized packet of an upper layer of a stack of communication protocol layers from a flow of packets, said method comprising the steps of:

searching in the flow of packets for delineation information and, when found, decoding a header of a found packet, then extracting the upper layer packet header, and pointing out a payload of the found packet, then extracting the upper layer packet payload, reading the length field out of the found packet header in order to point out the payload of the found packet, and wherein said flow of packets is generated from a packet intended to be managed by a layer of the communication protocol stack between the upper layer supporting variable sized packets and a lower layer supporting fixed size packets, wherein said packet is a variable sized packet whose header is made up by adding delineation information to the header of the upper layer packet and whose payload contains the payload of said upper layer packet.

14. Method according to claim 13, wherein it includes a step of checking that no error has occurred in the header during transmission of the found packet and, if it has, restarting the step of searching an information delineation.

15. Method according to claim 13, wherein it includes a step of checking that no error has occurred in the payload during transmission and, if it has, restarting the step of searching an information delineation.

16. Method according to claim 13, wherein it includes a step of reading the length code field out of the found packet header in order to read the header of the upper layer packet.

17. A method for transmitting packets, comprising:

transmitting variable sized packets from an upper layer to a lower layer of a stack of communication protocol layers including at least four layers, one of which is an ARQ (Automatic Retransmission Request) layer, processing said variable sized packets into an alternative set of variable sized packets, each packet of the alternative set including header and payload of an upper layer packet and additional identification information added to said header, segmenting said alternative set into a set of fixed size packets for a lower layer of the stack to be transmitted to a receiver, wherein said set of fixed packets being made with said alternative set of variable size packets.

18. The method of claim 17, wherein said processing includes adding a flag as said additional identification information.

19. The method of claim 17, wherein said processing includes adding a field which indicates length of the payload as part of the header.

20. A method for receiving packets, comprising:

transmitting fixed size packets which are received by a lower layer of a stack of communication protocol layers including at least four layers, one of which is an ARQ (Automatic Retransmission Request) layer, recovering variable size packets of an upper layer of the stack, wherein said variable size packets being made with said fixed size packets, by performing the steps of:

decoding header of each packet of the processed packets using identification information located in the header to determine and extract header of each packet of the upper layer of the stack, locating payload of each processed packet to determine and extract payload of each upper layer packet.

* * * * *